March 18, 1930. L. CAMPBELL, JR 1,751,448
BLOWPIPE TIP AND PROCESS OF MAKING SAME
Filed June 20, 1928
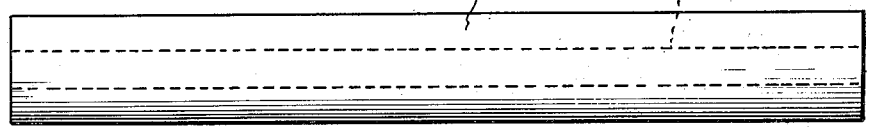
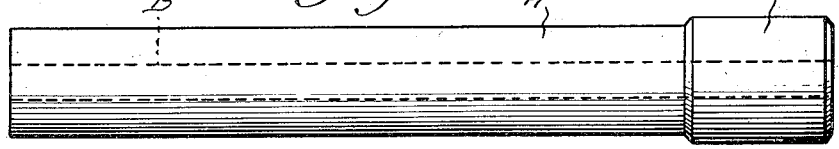
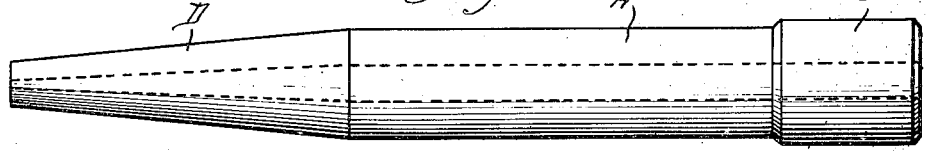
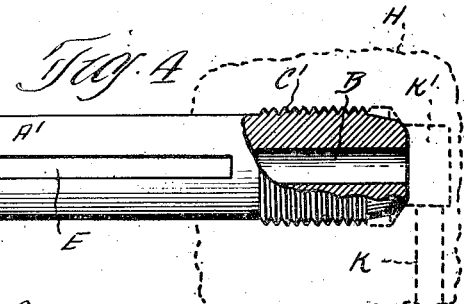
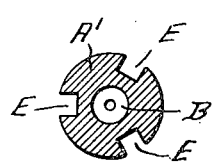

Patented Mar. 18, 1930

1,751,448

UNITED STATES PATENT OFFICE

LORN CAMPBELL, JR., OF LAKEWOOD, OHIO, ASSIGNOR TO THE HARRIS CALORIFIC COMPANY, OF CLEVELAND, OHIO, A CORPORATION OF OHIO

BLOWPIPE TIP AND PROCESS OF MAKING SAME

Application filed June 20, 1928. Serial No. 286,988.

This invention relates to blowpipe tips and to a process of making the same, and more particularly to the manufacture of inner tip members for blowpipes of the type shown in Harris Patent No. 1,217,119, issued February 20, 1917, wherein the inner tip member is provided with a central bore and is also provided in its outer surface with slots, which slots are closed at their outer sides by a surrounding outer tip member and serve to deliver a mixture of oxygen and combustible gas to the operating end of the complete tip.

It is the general purpose and object of the invention to provide a process whereby tip members of the character referred to may be produced in a simple and inexpensive manner; also to improve tip members in the matter of the construction of their upper ends, as will be pointed out hereinafter.

In the drawings forming a part hereof, I have shown a perforated block or blank of metal in its original form and in the successive forms imparted thereto and leading up to the production of a tip member of the type referred to hereinbefore.

In the said drawings, Fig. 1 represents a side elevation of a piece or blank of ductile metal, such as copper, as it appears prior to the next operation thereon; Figs. 2 and 3 are views, similar to Fig. 1, and showing successive shapes imparted to the original piece or blank; Fig. 4 a view, partly in elevation and partly in section of a completed inner tip member for a cutting blowpipe; and Figs. 5 and 6 are details in section corresponding respectively to the lines 5—5 and 6—6 of Fig. 4.

In producing a tip member in accordance with my invention, I first take a cylindrical body or blank A of ductile metal, such as copper, and provide the same with a central bore B of suitable diameter. I next subject this body or blank to a swaging or upsetting operation at one end thereof, whereby the body is thickened at such end, as indicated at C, the length of the body being reduced somewhat by this operation. I next swage the opposite end of the body to a frusto-conical shape, as indicated at D in Fig. 3. At the end of this operation, the resultant body will have a cylindrical intermediate portion A' of substantially the same diameter as the original body or blank A, with a cylindrical end portion C of greater diameter than the portion A', and a frusto-conical end portion D.

For the purpose of assembling the tip member, the end C is provided with a thread C', which thread enables the tip member to be screwed into a chamber in the blowpipe head, a portion of which is shown in dot-and-dash lines at H, the bore B of the inner tip member receiving cutting oxygen from a suitable passage K and chamber K' in such head; and the extreme end of the part C is rounded and tapered to enable it to seat properly with reference to the chamber K'.

I then machine the frusto-conical portion of the body to produce therein an intermediate short frusto-conical portion D' and a lower frusto-conical portion D², with an outwardly projecting shoulder F between the bottom of the portion D' and the top of the portion D². I then provide the portion A' with a plurality of slots E extending to the part D' and the portion D² with a plurality of slots G which extend the full length of such portion D². When an outer tip member having an interior contour corresponding to the parts A', D is fitted over the inner tip member, the outer sides of the slots E and G will be closed, forming passages for the mixture of oxygen and combustible gas.

By upsetting the upper or inner end of the blank of which the tip member is formed, this end is enlarged, making it convenient to provide the same with a thread and to screw this end of the member into a threaded seat therefor in the blowpipe head. Furthermore, by this treatment, the metal comprising this end of the tip member is densified, whereby its life is increased.

Where the tip member is intended for use in a welding torch, it will be unnecessary to provide the body with the slots E and G and with the intermediate frusto-conical portion D'. The tip member in this case will be of the contour shown in Fig. 3 except that the part C will be threaded and finished in the manner shown in Fig. 4.

Due to my process, tip members may be constructed in an economical manner; their assembly in blowpipe heads will be facilitated; and the lives of the tip members will be increased.

Having thus described my invention, what I claim is:—

1. The process of making a blowpipe tip member which comprises providing a cylindrical blank of ductile metal with a central bore extending longitudinally therethrough, upsetting an end of the said blank to provide the same with an enlarged cylindrical projection, thereby compacting the metal comprising the said end and projection, swaging the opposite end of the said blank to substantially frusto-conical shape, and providing the enlarged cylindrical end of such blank with a thread and with a tapered seating portion extending from such threaded portion to the end of the body adjacent thereto.

2. A process of making a blowpipe tip member which comprises providing a cylindrical blank of ductile metal with a central bore extending longitudinally therethrough, upsetting one end of the said blank to provide the same with an enlarged cylindrical projection, thereby compacting the metal comprising the said end and projection, swaging the opposite end of the said blank to substantially frusto-conical shape and simultaneously reducing the cross-sectional area of the bore in such end portion, and providing the enlarged cylindrical end of such blank with a thread and with a tapered seating portion extending from such thread to the end of the body adjacent thereto.

3. The process of making a blowpipe tip member which comprises providing a cylindrical blank of ductile metal with a central bore extending longitudinally therethrough, upsetting one end of the said blank to provide the same with an enlarged cylindrical projection, thereby compacting the metal comprising the said end and projection, swaging the opposite end of the said blank to substantially frusto-conical shape and simultaneously reducing the bore in such end portion, removing a portion of the exterior of such frusto-conical end portion adjacent to the cylindrical intermediate portion of said body, thereby to provide the body with a depression adjacent such cylindrical portion, which depression has a frusto-conical contour, longitudinally slotting the lower frusto-conical portion and the intermediate cylindrical portion of said body, and providing the enlarged cylindrical end of such blank with a thread and with a tapered seating portion extending from such thread to the end of the body adjacent thereto.

4. A tip member for blowpipes comprising an enlongated body having a central bore therethrough and having one end threaded to enable the said member to be secured in place within a blowpipe head and having a tapered seat-engaging portion extending from the thread, the metal comprising such threaded end being upset, whereby the threaded end is of greater diameter than the portion of the tip member adjacent thereto and the metal in such threaded end is compacted.

In testimony whereof, I hereunto affix my signature.

LORN CAMPBELL, Jr.